United States Patent [19]
Fassell

[11] 3,811,900
[45] May 21, 1974

[54] REFRACTORY ARTICLE HAVING HIGH THERMAL SHOCK RESISTANCE

[75] Inventor: Wayne M. Fassell, Newport Beach, Calif.

[73] Assignee: Philco-Ford Corporation, Philadelphia, Pa.

[22] Filed: Jan. 7, 1972

[21] Appl. No.: 216,238

[52] U.S. Cl............... 106/55, 106/57, 106/58, 106/62, 106/65, 106/69
[51] Int. Cl.............................................. C04b 35/58
[58] Field of Search............. 106/55, 65, 57, 58, 62, 106/69; 423/290

[56] References Cited
UNITED STATES PATENTS

| | | | |
|---|---|---|---|
| 2,854,736 | 10/1958 | Taylor | 106/55 |
| 2,872,327 | 2/1959 | Taylor | 106/55 |
| 3,144,305 | 8/1964 | O'Connor | 423/290 |
| 3,561,920 | 2/1971 | Kinter et al. | 423/290 |

*Primary Examiner*—James E. Poer
*Attorney, Agent, or Firm*—William E. Johnson; Keith L. Zerschling; Robert D. Sanborn

[57] ABSTRACT

Highly ordered boron nitride flakes having a greater surface dimension between about 0.003 inch and 0.030 inch and a thickness less than one-tenth of the greater surface dimension are mixed homogeneously with a refractory material and formed into a refractory article. The boron flakes intersect and arrest microcracks formed in the article by thermal shock or other stress producing conditions. Suitable highly ordered boron nitride flakes can be made by grinding pyrolytic boron nitride obtained by reacting a gaseous mixture of boron trichloride and ammonia.

10 Claims, No Drawings

REFRACTORY ARTICLE HAVING HIGH THERMAL SHOCK RESISTANCE

SUMMARY OF THE INVENTION

Boron nitrides with various crystal structures have become available in recent years. Cubic boron nitride probably has become most widely known because of its extreme hardness. Boron nitride having a graphite type crystal structure has excellent lubricating properties and can be incorporated into polymeric materials as a mold releasing agent. The graphite type crystal structure also improves the radiation shielding properties of polymers. Boron nitrides generally have high melting temperatures and have been molded into rocket nozzles, reaction chamber liners, furnace liners, etc.

Where sintered and hot pressed versions of most boron nitrides have acceptable machining properties, pyrolytic boron nitride has remained a laboratory curiosity mainly because of its tendency to split or disintegrate under even mild machining. This invention is based on the discovery that homogeneously mixing highly ordered boron nitride flakes such as pyrolytic boron nitride with a refractory material produces a refractory article having extremely high thermal shock resistance. The refractory articles resist thermal spalling and other modes of thermal failure and are useful as high temperature engine components and in other applications where a heat resistant material must be subjected to large, rapid temperature changes.

Highly ordered boron nitride flakes useful in the invention preferably have a minimum greater surface dimension of at least 0.002 inch. Useful flakes have a plate structure with a large surface area relative to thickness and the phrase "greater surface dimension" as used herein identifies the larger dimension of the surface of a flake. The phrase "highly ordered" as used herein refers to the polycrystalline arrangement of a flake in which the hexagonal crystal structure is very nearly perfect. Pyrolytic boron nitride having a purity of at least 99.9 percent and an almost perfectly dense and ordered crystal structure exemplifies a preferred, highly ordered boron nitride.

Refractory articles having the best combination of thermal shock resistance and strength are produced by highly ordered boron nitride flakes having a greater surface dimension less than about 0.050 inch. Using boron nitride flakes having a greater surface dimension above this size generally tends to decrease the strength of the resulting refractory article. The flakes useful in this invention preferably have a thickness less than about one-tenth of the greater surface dimension. Boron nitride flakes having a thickness as low as about 0.0005 inch have been found to be useful. Both surface dimensions of the boron nitride flakes preferably are approximately equal.

Refractory materials particularly useful in the invention include the refractory oxides such as magnesia, alumina, beryllia, thoria, silica and zirconia. Other refractory materials such as mullite, corundum, spodumene, cordierite, etc. also can be used with good results. A good combination of economy, thermal shock resistance, and strength is achieved by mixing homogeneously about 1–20 weight percent of the boron nitride flakes into the refractory materials. High strength and limited thermal shock resistance can be acquired with about 2–5 weight percent of the boron nitride flakes. Increased thermal shock resistance with slightly decreased strength is achieved by increasing the weight proportion of the boron nitride flakes. Mixtures containing above 20 weight percent of the boron nitride flakes can be used in applications requiring extremely high thermal shock resistance and relatively low strength. The mixtures preferably are hot pressed at a temperature of at least two-thirds of the mixture melting point to densities exceeding 80 percent of theoretical.

Pyrolytic boron nitride flakes having high purity, high density and a highly ordered crystal structure can be obtained by heating a gaseous mixture of boron trichloride and ammonia to at least about 2,000°C in the presence of a graphite substrate. The ammonia and the boron trichloride gases usually are in approximately equal quantities. Pyrolytic boron nitride deposits on the graphite substrate. The boron nitride is ground to the desired flake size and mixed homogeneously with an appropriate amount of the refractory material. Hot pressing techniques can be used to form the resulting mixture.

Microscopic investigations reveal that subjecting the refractory articles of the invention to thermal shock conditions produces microcracks therein. The boron nitride flakes intersect such microcracks and effectively halt propogation thereof, thereby preventing massive thermal shock failure of the article. Complete intersection of a microcrack by a boron nitride flake appears to be essential to achieving the high thermal shock properties. This criteria seems to establish the lower limit of about 0.002 inch for the greater surface dimension of the boron nitride flakes, since flakes below this value have a relatively low probability of completely intersecting microcracks. The best combination of thermal shock resistance and strength is provided by flakes having a greater surface dimension between about 0.003 inch (76 microns) and 0.030 inch (760 microns).

DETAILED DESCRIPTION

Example 1

Ten weight parts pyrolytic boron nitride are ground to a flake having a greater surface dimension of about 0.010 inch and mixed with 90 weight parts alumina (99.18 percent pure). The mixed powder is placed in a disc shaped graphite die and induction heated to 1,650°C. A compacting force of 3,000 pounds per square inch is applied to the heated powder for 20 minutes. The die and pressed disc are cooled to room temperature before the disc is removed from the die.

The resulting disc is ¼-inch thick and has a diameter of 1½ inches. Its density is 98 percent of theoretical. One edge of the disc is heated with an oxygen-natural gas torch until rounding of the edge is visible (approximately 2,000°C). The disc then is dropped in cold water. No significant cracks can be detected until after 10 repetitions of this test.

EXAMPLE 2

Ten weight parts pyrolytic boron nitride are ground to a greater surface dimension of about 0.016 inch (400 microns) and mixed with 90 weight parts fine grained beryllia having an average grain diameter of 15 microns. Hot pressing the mixture as described in Example 1 produces a disc having a nominal density of 2.75 gm/cm$^3$.

Various tests show that the material has remarkable thermal shock resistance. Propagation of thermally induced shock waves is arrested by the boron nitride flakes, thereby enabling the material to withstand severe heating without failure. Specimens of this material have withstood simulated re-entry environmental heating such as 1,300 BTU/ft$^2$— sec. at a total enthalpy of 2,600 BTU/lb. and a model stagnation pressure of 6 atmospheres. Increasing the boron nitride proportion to 20 weight percent produces even better thermal shock properties.

Thus this invention provides refractory articles having a greatly improved combination of thermal shock resistance and strength. Articles having flexure strengths approaching 17,000 psi and thermal gradients of 2,500°C per one-eighth inch can be produced with reasonable economy.

I claim:

1. A refractory article having high thermal shock resistance consisting essentially of a refractory material homogeneously mixed with boron nitride flakes having an ordered crystal structure, said boron nitride flakes having a greater surface dimension of at least 0.002 inch, said surface dimension being sufficient to intersect and arrest microcracks formed in the article.

2. The refractory article of claim 1 in which the boron nitride flakes have a thickness less than one-tenth of the greater surface dimension.

3. The refractory article of claim 2 in which the greater surface dimension of the boron nitride flakes is between about 0.003 inch and 0.030 inch.

4. The refractory article of claim 3 in which the boron nitride flakes are highly ordered pyrolytic boron nitride.

5. The refractory article of claim 4 comprising about 1 to 20 weight percent of said boron nitride flakes.

6. The refractory article of claim 1 in which the greater surface dimension of the boron nitride flakes is between about 0.003 inch and 0.030 inch.

7. The refractory article of claim 1 in which the boron nitride flakes are highly ordered pyrolytic boron nitride.

8. The refractory article of claim 1 comprising about one to twenty weight percent of said boron nitride flakes.

9. A process for producing a refractory article having high thermal shock resistance comprising preparing highly ordered boron nitride flakes having a greater surface dimension of at least 0.002 inch, mixing homogeneously said boron nitride flakes with a refractory material, and forming the mixture into the shape of the refractory article.

10. The process of claim 9 in which the step of preparing the boron nitride flakes comprises heating a gaseous mixture of boron trichloride and ammonia to at least 2,000°C. in the presence of a graphite substrate and depositing the resulting boron nitride on the graphite substrate, and the forming step comprises forming the mixture into the shape of the refractory article and hot pressing the article at a temperature of at least two thirds of the melting temperature of the mixture.

* * * * *